United States Patent [19]

Baig

[11] Patent Number: 5,922,447
[45] Date of Patent: Jul. 13, 1999

[54] LIGHTWEIGHT GYPSUM BOARD

[75] Inventor: Mirza A. Baig, Des Plaines, Ill.

[73] Assignee: United States Gypsum Company, Chicago, Ill.

[21] Appl. No.: 08/714,339

[22] Filed: Sep. 16, 1996

[51] Int. Cl.$^6$ .......................... B32B 13/02; B32B 13/08; B32B 31/06; B32B 31/14
[52] U.S. Cl. ................. 428/292.7; 106/675; 106/680; 106/698; 106/772; 106/780; 156/39; 156/42; 156/43; 428/294.7; 428/312.4; 428/313.7; 428/317.9; 428/340; 428/703
[58] Field of Search ................. 156/39, 42, 43; 106/675, 680, 698, 772, 780, 783; 428/703, 312.4, 292.7, 294.7, 313.7, 317.9, 340; 264/333

[56] References Cited

U.S. PATENT DOCUMENTS

| | | |
|---|---|---|
| 1,500,452 | 7/1924 | Haggerty . |
| 2,207,339 | 7/1940 | Camp . |
| 2,803,575 | 8/1957 | Riddell et al. ............................. 156/39 |
| 3,307,987 | 3/1967 | Bieri . |
| 3,389,042 | 6/1968 | Bieri et al. . |
| 3,516,882 | 6/1970 | Cummisford ............................. 156/39 |
| 3,819,388 | 6/1974 | Cornwell . |
| 3,988,199 | 10/1976 | Hillmer et al. . |
| 4,009,062 | 2/1977 | Long . |
| 4,126,512 | 11/1978 | Hill . |
| 4,238,546 | 12/1980 | Phillips . |
| 4,328,178 | 5/1982 | Kossatz .................................... 106/680 |
| 4,454,267 | 6/1984 | Williams . |
| 5,256,222 | 10/1993 | Shepherd et al. . |
| 5,277,856 | 1/1994 | Bucking ................................... 264/112 |
| 5,342,566 | 8/1994 | Schafer et al. ........................... 156/42 |
| 5,558,710 | 9/1996 | Baig ........................................ 106/780 |
| 5,632,848 | 5/1997 | Richards et al. ......................... 156/39 |

FOREIGN PATENT DOCUMENTS

| | | |
|---|---|---|
| 0585200 | 3/1994 | European Pat. Off. . |
| 53-134814 | 11/1978 | Japan . |
| 4194067 | 7/1992 | Japan . |

OTHER PUBLICATIONS

Appleyard, "Construction Materials—Gypsum and Anhydrite", *Industrial Minerals and Rocks*, 5th Edition, S.J. Lefond, ed., AIME, 1983, pp. 183–198.

*Primary Examiner*—Steven D. Maki
*Attorney, Agent, or Firm*—Greer, Burns & Crain, Ltd.; David F. Janci; John M. Lorenzen

[57] ABSTRACT

A lightweight gypsum board is provided, including, by dry weight, gypsum as the largest single ingredient, perlite as the second largest single ingredient, and starch as a minor ingredient, in the board. The starch may be pre-cooked prior to mixing, and is dispersed in the core of the board to act as a binder for binding the gypsum to the perlite. Gypsum board made according to the invention is lighter in weight, yet has a comparable nail pull value to conventional wallboard.

14 Claims, No Drawings

LIGHTWEIGHT GYPSUM BOARD

BACKGROUND OF THE INVENTION

The present invention relates to gypsum board used in the construction of walls and ceilings, and specifically to a lightweight gypsum board suitable for use as wallboard or ceiling board, and which has a comparable cost to conventional ½ inch gypsum wallboard.

Gypsum wallboard is well known for use in interior wall and ceiling construction, and its main advantages include low cost, fire retardance and easy workability in construction applications. However, a major drawback of conventional gypsum wallboard is its weight. Conventional ½ inch thick wallboard has a weight of between 1650 to 1800 pounds per 1,000 square feet, or pounds MSF, as this value is referred to in the industry. The relatively heavy weight of conventional wallboard sheets makes them cumbersome and fatiguing for installers to work with. This is especially true when wallboard is used for ceilings, since the individual sheets must be supported over the installer's head either by hand or with mechanical supports against the ceiling joists until appropriate fasteners may be employed to secure the board in place.

Prior attempts to lighten wallboard have involved the use of foam or soap slurries to trap air in the gypsum mixture, thus creating a less dense board core. However, the boards resulting from such attempts sometimes lacked the necessary strength for use in wall and ceiling applications. An industry measure of such strength is the pounds of nail pull, or the amount of force required for the board to be pulled over the head of a nail. A preferable nail pull value for wallboard is in the approximate range of between 65 and 85 pounds of force. Other disadvantages of the use of foam as a filler include the fact that the foaming agents generally interfere with proper hydration, crystal growth and setting of the gypsum and may interfere with the cohesive bond between the core and the paper.

Alternative solutions for producing lightweight gypsum board have employed the use of expanded monocellular volcanic ash. When heated, this material expands, forming hollow, relatively watertight spheres. When the spheres are mixed with the gypsum, air pockets are created which reduce board density. Boards have been made from combinations of ash and gypsum which are lighter in weight than conventional wallboard, however such boards lack the requisite strength of conventional wallboard.

Thus, it is a first object of the present invention to provide an improved gypsum wallboard product which is lighter in weight than conventional wallboard, yet has comparable nail pull values.

It is another object of the present invention to provide an improved gypsum building board which may be used for suspended ceilings as well as wallboard applications.

It is still another object of the present invention to provide an improved process for making lightweight gypsum building board and wallboard.

SUMMARY OF THE INVENTION

The above objects are met or exceeded by the present lightweight gypsum wallboard, which includes gypsum and perlite as the primary constituents, with the preferred use of starch as a binder. The starch remains in the core portion of the board and more securely binds the perlite spheres to the gypsum particles than in prior gypsum board compositions. An improved process for making the present lightweight gypsum board includes cooking the starch prior to mixing it with calcined gypsum, perlite and other constituents. By at least partially cooking the starch, it is less likely to migrate to the face paper at the boundaries of the core, as is typical with conventional wallboard production techniques. Instead, the starch remains in the core, where it binds the perlite with the gypsum particles that form from the calcined gypsum and also aids in bonding the face paper to the core. Another advantage of the use of perlite is that the relatively porous, matrix-like structure of the individual perlite granules or particles is that they retain water during the forming of the gypsum board. As this water is driven off during the drying process, the resulting gypsum/perlite board is appreciably lighter than conventional wallboard, yet the presence of the perlite and starch result in comparable strength to conventional wallboard More specifically, a lightweight gypsum board is provided, including, by dry weight, gypsum as the largest single ingredient being at least 50% of the formulation of the core by dry weight, and perlite as the second largest single ingredient, being less than 50% of the formulation of the core by dry weight, and starch as a minor ingredient in the board formulation (the formulaton of the core), wherein the resulting board has a lower density, yet comparable strength, when compared to conventional wallboard. In the preferred embodiment, by dry weight of the formulation of the core, the gypsum makes up about 75% to 95%, the perlite approximately 1% to 25% and the starch 0.25% to 6%. Also preferred is the use of cellulose fiber as a filler in the range of 0.5% to 7.0% by dry weight of the formulation. A more preferred use of fiber is in the range of 0.5% to 5.6% by dry weight of the formulation. The preferred gypsum board made according to the present invention has a density range of 21.5% to 37.1% pounds per cubic foot. Gypsum wallboard made according to the invention is lighter in weight, yet has a comparable nail pull value to conventional wallboard.

DESCRIPTION OF THE PREFERRED EMBODIMENTS

Gypsum wallboard consisting of an essentially gypsum core surfaced with a paper bonded to the core is commonly used in the construction industry. Such wallboard is commonly manufactured by placing a slurry consisting essentially of calcined gypsum (referred to in the industry as "stucco"), water and minor additives such as starch, setting agents and/or accelerating agents between parallel sheets of facing paper, allowing the calcined gypsum to hydrate and harden (i.e., chemically convert or "set" to form gypsum), and subsequently heating the composite board to drive excess water from the core. The basic technology of gypsum wallboard manufacture is disclosed in U.S. Pat. Nos. 1,500,452; 2,207,339; and 4,009,062 all of which are incorporated by reference herein. Conventional ½ inch thick gypsum wallboard weighs about 1700 lb/MSF. Due to the high production volume of gypsum wallboard, a reduction in board weight of as little as 30 lb/MSF can result in significant savings for a manufacturer.

The lightweight gypsum wallboard of the invention was manufactured from the following ingredients. First, the primary component of the formulation of the core to make the board by dry weight, is calcined gypsum or calcium sulfate hemihydrate, also referred to in the industry as stucco. The gypsum material used in the tests was obtained from a USG plant at Gypsum, Ohio. By dry weight, the gypsum comprises in the range of 75 % to 95 % of the board formulation (formulation of the core).

After gypsum, the next most prevalent material by dry weight is perlite, which is a form of glassy rock similar to obsidian. It generally contains 65–75% $SiO_2$, 10–20% $Al2O_3$, 2–5% $H_2O$, and smaller amounts of soda, potash, and lime. When perlite is heated to the softening point, it expands to form a light fluffy material similar to pumice. In preparing the perlite for use in the present invention it is first ground to a size finer than minus 200 mesh. The ground perlite is then heated to a temperature of about 1500°–1800° F., and preferably about 1750° F. This process is carried out in a perlite expander by first heating the air to 1500° F. The finely ground perlite is then introduced into the heated air. As it is carried by the air, it is heated and pops like popcorn. Expanded perlite is a very lightweight material. However, it contains many fine cracks and fissures, and, when placed in contact with water, the water penetrates the cracks and fissures and enters into the air filled cavities of the perlite, thereby greatly increasing the weight of the particles. For the purposes of the present lightweight board, it is important that the perlite not be coated or treated in any way which will make the individual perlite particles watertight or even water resistant. If so, the water resistant coating or treatment will result in non-uniform distribution of the perlite in the gypsum slurry, and it will also be more difficult, if not impossible, for the gypsum crystals to penetrate and interlock with the perlite particles.

In the tests described below, the perlite was Type 3-S brand perlite from Silbrico located in Hodgkins, Ill., having a density of 3 to 3.5 lb/cu.ft. The use of other conventionally available perlite sources having densities from 6 to 8.5 lb/cu. ft. is also contemplated. By dry weight, the perlite preferably comprises in the range of 5 to 25%, and favorable results in terms of relatively low weight and relatively high nail pull were achieved when the perlite comprised in the range of 8 to 15% of the board formulation (the formualation of the core). It is believed that the many cracks and fissures of the perlite particles provide sites for the gypsum crystals to extend into the interior portions of the perlite particles, which promotes the strength of the resulting board. Another advantage of the perlite is its ability to retain water during formulation of the board. This enables the perlite particles to be uniformly dispersed in the calcined gypsum slurry, rather than floating to the surface of the slurry. During the drying phase of the board fabrication process, this water is driven off, which contributes both to the lower density, and to the relatively comparable strength levels of conventional gypsum wallboard. Thus, it has been found that the use of perlite is more suitable for wallboard than foam or surfactants, because the presence of the perlite spheres, while decreasing the density of the board, does not impair the fastener's ability to secure the board to the respective wall or ceiling frame.

After perlite, by dry weight the next most prevalent material in the formulation is starch, which may be provided in raw form or partially or fully cooked separately prior to mixing with the calcined gypsum and perlite. Partial cooking in the present process is considered to occur once the starch and water slurry reaches 150° F. The starch is considered to be fully cooked once the starch slurry reaches at least 185° F. In the preferred embodiment, pearl starch is used, which is a known combination of starch made from corn, potato, and/or wheat stock. Through partial or full cooking, the pearl starch is converted from being migrating in nature to being non-migrating in nature. When non-migrating, the starch is retained in the core portion of the board prior to setting to assist the calcined gypsum in binding to the perlite, which gives the resulting board its strength. In addition, the presence of the starch in the core also aids in the binding of the face paper to the core. Alternate sources of starch which are also contemplated are acid modified starches including Gypset made by Ogilive, located in Montreal, Canada, and LC-211, a common starch made from flour, supplied by Archer Daniels Midland of Dodge City, Kans. In the latter two cases, the starches are of the migrating type, and the use of these starches resulted in lightweight wallboard with similar nail pull values to samples obtained using non-migrating starch. It is preferred that, by weight, the starch comprises in the range of 0.25% to 6.0% of the formulation of the core. In the examples below, raw (uncooked) pearl starch was also employed, with less desirable results being obtained.

As a preferred, yet optional ingredient, cellulose fiber is added to the board formulation (formulation of the core) to lower board density. It was also found that the fiber increased the nail pull of the subject board. The most desirable form of fiber is hydropulp newsprint, however it is also contemplated to employ wood fiber, co-calcined gypsum/and wood fiber, and/or dry paper fiber, or other equivalent fibrous materials. However, the use of large wood fiber is considered less desirable from a cost standpoint, and from a performance standpoint, because when such fiber is used, the resulting board is harder to score and snap. It is preferred that the fiber comprise in the range of 0.5% to 7.0of by dry weight of the formulation of the core.

Other minor ingredients which are preferably added to the present gypsum board formulation include a small amount of an accelerator referred to as HRA in the examples below, which is preferably fine dihydrate gypsum powder used to reduce the setting time of the board. Similarly, a conventional dispersing agent may be employed as is known in the art, such as the product sold under the name NORLIG by Lignotech, located in Rothschild, Wis. It is also contemplated to combine the perlite with standard wallboard foam, however, the foam lowers the nail pull of the board when compared to the examples below in which only perlite is used. Conversely, the addition of perlite to standard wallboard may increase the nail pull value.

In order to make the present lightweight gypsum board, a slurry of starch and water is prepared and heated to 150° F., or 185° F. as desired. This precooked starch slurry is retained separately until needed. In another separate container, a slurry of cellulose fiber and water is prepared. To a main mixing container are added the dry ingredients, including calcined gypsum, perlite, the dispersing agent (considered to be optional), the wetting agent, and/or the accelerator (latter two also considered to be optional). If precooked starch is not used, the starch, such as Gypset or LC-211 is also added to this container.

The starch slurry is placed in a mixing container, followed by the fiber slurry and the dry ingredients. Next, the combined ingredients are mixed with water and agitated to obtain relatively uniform consistency. For achieving optimum results in board characteristics, it is important that the agitation be accomplished in a manner which is not overly aggressive to the point where the perlite particles are shattered or crushed. The amount and severity of the agitation will depend on the percentage of perlite in the mix, the amount of water, and the weight of the desired board product. In the examples described below, a Hobart commercial grade mixer was used as the agitator, and was set at low speed for about 5–10 seconds, and for about 5–10 seconds at high speed for approximately 20–25 seconds total mixing time.

The resulting mixed slurry was poured onto a sheet or web of standard wallboard face paper and covered with a second web or sheet of wallboard face paper. Drying of the resulting board occurs at 350° F. to evaporate 25% of the moisture. Subsequently, the board was dried at 110° F. to drive away additional moisture until a constant weight was achieved.

In that the following examples were prepared in a laboratory, the thickness of the resulting board was not as easy to precisely maintain at a desired value, such as ½ inch. However, it will be appreciated by those skilled in the art that under full scale manufacturing conditions, board thickness is readily maintained to close tolerances. It will also be appreciated that under manufacturing conditions, each of the two slurries and the dry ingredients will be supplied via separate sources directly into a mixing container.

Gypsum board was produced from the following samples of gypsum board formulation (formulation for the core) according to the process described above. The following examples are for the purpose of illustration only and are not intended to limit the claimed invention to the examples cited.

EXAMPLE I

| Ingredient | Percent (dry weight) |
| --- | --- |
| Gypsum (hemihydrate) | 71.7 |
| Perlite (3-S, Silbrico) | 17 |
| Starch (Raw, Pearl) | 5.6 |
| Fiber (Hydropulped) | 5.6 |
| Total Solids gms | 1259 |
| Total Water gms | 2787 |
| Water/Solids Ratio | 2.2:1 |
| HRA (accelerator gms) as needed | 2 |
| Set Time (min): | 6 |
| Board Properties | |
| Thickness (inch) | 0.500 |
| Density, lb/cuft (1b/MSF) | 22 (916.6) |
| Nail Pull, lb | 42 |

EXAMPLE II

| Ingredient | Percent (dry weight) |
| --- | --- |
| Gypsum (hemihydrate) | 79 |
| Perlite (3-S, Silbrico) | 15 |
| Starch (Raw, Pearl) | 2 |
| Fiber (Hydropulped) | 3 |
| Total Solids gms | 1743 |
| Total Water gms | 3392 |
| Water/Solids Ratio | 1.9:1 |
| HRA (gms) as needed | 10 |
| Set Time (min). | 10 |
| Board Properties | |
| Density, lb/cuft (1b/MSF) | 23.2 (1110) |
| Thickness, inch | 0.574 |
| Nail Pull, lb | 42 |

The boards made from the formulations of Examples I and II have a lower nail pull value, but are relatively lightweight, which is a favorable characteristic for use as a ceiling panel in a suspended ceiling system, or other applications for construction board which are less rigorous than for conventional wallboard. Since the above Examples utilize raw (as opposed to cooked or partially cooked) pearl starch, the starch will migrate prior to the setting of the board. Thus, less starch will remain uniformly dispersed in the core to bind the calcined gypsum to the perlite. As such, the resulting board will be weaker and will have a lower nail pull value.

EXAMPLE III

| Ingredient | Percent (dry weight) |
| --- | --- |
| Gypsum (hemihydrate) | 81.6 |
| Perlite (3-S, Silbrico) | 11.5 |
| Starch (Cooked, Pearl) | 4.6 |
| Fiber (Hydropulped) | 2.3 |
| Total Solids gms | 1736 |
| Total Water gms | 3455 |
| Water/Solids Ratio | 2.0:1 |
| HRA (gms) | 3 |
| Set Time (min) | 10 |
| Board Properties | |
| Thickness, inch | 0.546 |
| Density, lb/cuft (lb/MSF): | 29.3 (1333) |
| Nail Pull, lb | 76 |

EXAMPLE IV

| Ingredient | Percent (dry weight) |
| --- | --- |
| Gypsum (hemihydrate) | 83.5 |
| Perlite (3-S, Silbrico) | 11.8 |
| Starch (Cooked, Pearl) | 2.4 |
| Fiber (Hydropulped) | 2.4 |
| Total Solids gms | 1696 |
| Total Water gms | 3295 |
| Water/Solids Ratio | 1.9:1 |
| HRA (gms) | 3 |
| Set Time (min) | 12 |
| Board Properties | |
| Thickness, inch | 0.55 |
| Density, lb/cuft (lb/MSF): | 28.3 (1297) |
| Nail Pull, lb | 57 |

EXAMPLE V

| Ingredient | Percent (dry weight) |
| --- | --- |
| Gypsum (hemihydrate) | 81.6 |
| Perlite (3-S, Silbrico) | 11.5 |
| Starch (Partially Cooked, Pearl) | 4.6 |
| Fiber (Hydropulped) | 2.3 |
| Total Solids gms | 1736 |
| Total Water gms | 2613 |
| Water/Solids Ratio | 1.5:1 |
| HRA (gms) | 3 |
| Set Time (min) | 12 |
| Board Properties | |
| Thickness, inch | 0.545 |
| Density, lb/cuft (lb/MSF) | 29.1 (1322.0) |
| Nail Pull, lb | 65 |

EXAMPLE VI

| Ingredient | Percent (dry weight) |
| --- | --- |
| Gypsum (hemihydrate) | 87.8 |
| Perlite (3-S, Silbrico) | 9.3 |
| Starch (Partially Cooked, Pearl) | 0.6 |
| Fiber (Hydropulped) | 2.3 |
| Total Solids gms | 1719 |
| Total Water gms | 2400 |
| Water/Solids Ratio | 1.4:1 |
| HRA (gms) | 3 |
| Set Time (min): | 9.5 |

-continued

| Ingredient | Percent (dry weight) |
|---|---|
| Board Properties | |
| Thickness, inch | 0.581 |
| Density, lb/cuft (lb/MSF) | 31.4 (1520) |
| Nail Pull, lb | 74 |

EXAMPLE VII

| Ingredient | Percent (dry weight) |
|---|---|
| Gypsum (hemihydrate) | 87.2 |
| Perlite (3-S, Silbrico) | 9.3 |
| Starch (Partially Cooked, Pearl) | 1.2 |
| Fiber (Hydropulped) | 2.3 |
| Total Solids gms | 1721 |
| Total Water gms | 2440 |
| Water/Solids Ratio | 1.4:1 |
| HRA (gms) | 3 |
| Set Time (min) | 9.5 |
| Board Properties | |
| Thickness, inch | 0.582 |
| Density, lb/cuft (lb/MSF) | 30 (1455) |
| Nail Pull, lb | 69 |

EXAMPLE VIII

| Ingredient | Percent (dry weight) |
|---|---|
| Gypsum (Hemihydrate) | 87.8 |
| Perlite (3-S, Silbrico) | 10.5 |
| Starch (LC-211) | 0.5 |
| Fiber (Dry) | 1.2 |
| Total Solids gms | 1719 |
| Total Water gms | 2100 |
| Water/Solids Ratio | 1.2:1 |
| HRA (gms) | 2.5 |
| Norlig (gms) | 2.6 |
| Set Time (min) | 9.5 |
| Board Properties | |
| Thickness, inch | 0.505 |
| Density, lb/cuft (lb/MSF) | 38.3 (1612) |
| Nail Pull, lb | 78 |

EXAMPLE IX

| Ingredient | Percent (dry weight) |
|---|---|
| Gypsum (Hemihydrate) | 90.1 |
| Perlite (3-S, Silbrico, 75% perlite, 25% foam) | 8.1 |
| Starch (LC-211) | 0.6 |
| Fiber (Dry) | 1.2 |
| Total Solids gms | 1674 |
| Total Water gms | 1955 |
| Water/Solids Ratio | 1.2:1 |
| HRA (gms) | 2.5 |
| Norlig (gms) | 2.6 |
| Set Time (min) | 8 |
| Board Properties | |
| Thickness, inch | 0.504 |
| Density, lb/cuft (lb/MSF) | 34.1 (1432) |
| Nail Pull, lb | 65 |

The boards made according to Examples III–IX exhibit a heavier weight than that of Examples I and II, however, even the heaviest example of the present board is still significantly reduced in weight relative to conventional gypsum wallboard. Most significantly, the nail pull values of this appreciably lighter board are in the approximate range of 55–80 lb., which is comparable to that of conventional gypsum wallboard. It is believed that this higher nail pull value is achieved by the incorporation in the formulation of a combination of perlite and starch, which binds the perlite to the gypsum crystals. Gypsum crystals also penetrate the voids of the perlite particles to interlock with the particles. It is theorized that the binding action and the interlocking significantly strengthens the resulting gypsum board.

While a particular embodiment of the lightweight gypsum board of the invention has been shown and described, it will be appreciated by those skilled in the art that changes and modifications may be made thereto without departing from the invention in its broader aspects and as set forth in the following claims.

What is claimed is:

1. A lightweight gypsum wallboard comprising:
   a core including:
   a. gypsum, said gypsum being the largest single ingredient, by dry weight in the core, said gypsum comprising at least 50% of the dry weight of the core;
   b. perlite having a bulk density of approximately 3–3.5 pounds per cubic foot, said perlite being the second largest single ingredient, by dry weight, in the core, said perlite comprising less than 50% of the dry weight of the core and being distributed throughout said core;
   c. fibers comprising in the range of 0.5% to 5.6% of the dry weight of the core;
   d. starch comprising in the range of 0.25% to 6% of the dry weight of the core: and
   e. first and second sheets of face paper, said core being surfaced by said first and second sheets;
   wherein the wallboard ha a density of between 21.5 and 37.1 pounds per cubic foot.

2. The wallboard as defined in claim 1 wherein said fibers are cellulose fibers.

3. The wallboard as defined in claim 1, the core further including an accelerator and a dispersing agent as minor ingredients, by dry weight, in the core.

4. The wallboard as defined in claim 1 wherein said gypsum comprises between approximately 75% and 95%, by dry weight, of the core.

5. The wallboard as defined in claim 1 wherein said perlite is approximately 10%, by dry weight, of the core.

6. The wallboard as defined in claim 1 wherein the core has the approximate formulation by percent dry weight:

| Gypsum | 75% to 95% |
|---|---|
| Perlite | 1% to 25% |
| Fibers | 0.5% to [7.0] 5.6% |
| Starch | 0.25% to 6.0% |

7. The wallboard as defined in claim 6 wherein the core has the approximate formulation by dry weight.

| Gypsum | 87% |
|---|---|
| Perlite | 10% |
| Fibers | 2.3% |
| Starch | 0.6% |

8. The wallboard as defined in claim 1 having a nail pull value in the range of 60–80 pounds of force.

9. A process of making lightweight gypsum board having a core comprising:
   a. providing a supply of calcined gypsum, said gypsum being the largest single ingredient by dry weight in the core, said gypsum comprising at least 50% of the dry weight of the core;
   b. providing a supply of perlite having a bulk density of approximately 3–3.5 pounds per cubic foot and a supply of fibers in the range of 0.5% to 5.6% of the dry weight of the core, said perlite being the second largest ingredient by dry weight in the core, said perlite comprising less than 50% of the dry weight of the core;
   c. providing a supply of starch comprising in the range of 0.25% to 6% of the dry weight of the core;
   d. mixing said gypsum, said perlite, said fibers and said starch together with water to form a homogeneous slurry;
   e. spreading said slurry upon a first sheet of face paper;
   f. applying a second sheet of face paper upon said slurry to form a board having a core; and
   g. drying the board;
   wherein the board has a density of between 21.5 and 37.1 pounds per cubic foot.

10. The process as defined in claim 9 further including at least partially cooking said starch prior to the mixing step.

11. The process as defined in claim 9 further including providing a supply of wetting agent and including it in the mixing of said calcined gypsum, said perlite, said fibers, said starch, and water.

12. The process as defined in claim 9 wherein the fibers are cellulose fibers.

13. The process as defined in claim 9 further including providing a supply of accelerator and wetting agent and including the accelerator and wetting agent in the mixing of said calcined gypsum, said perlite, said fibers, said starch, and water.

14. The process as defined in claim 9 wherein at least a portion of said starch is partially cooked by heating a slurry of water and starch to approximately 150° F.

* * * * *